Feb. 26, 1924.　　　　　　　　　　　　　　　1,484,976
D. H. VAN HOVE
SPRING STRUCTURE
Filed Feb. 8, 1922　　　　　　　2 Sheets-Sheet 1
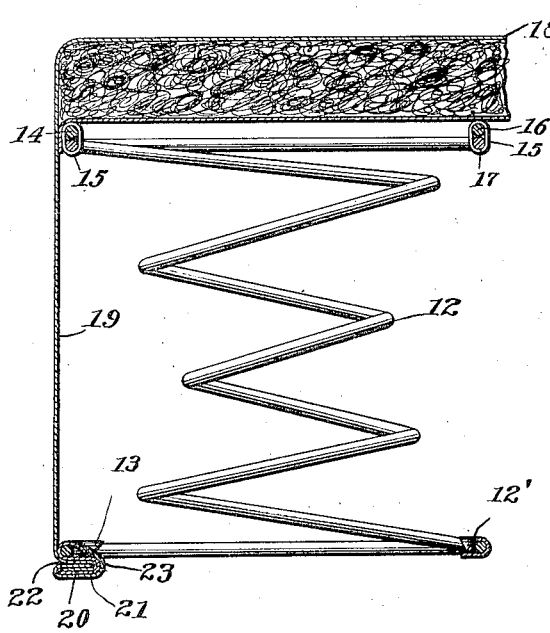
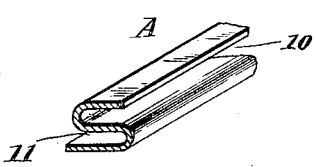
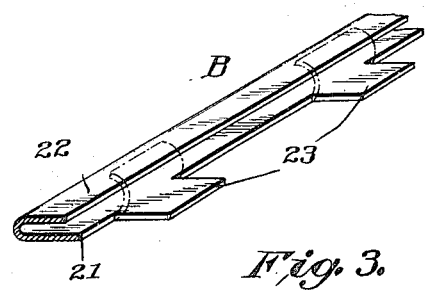
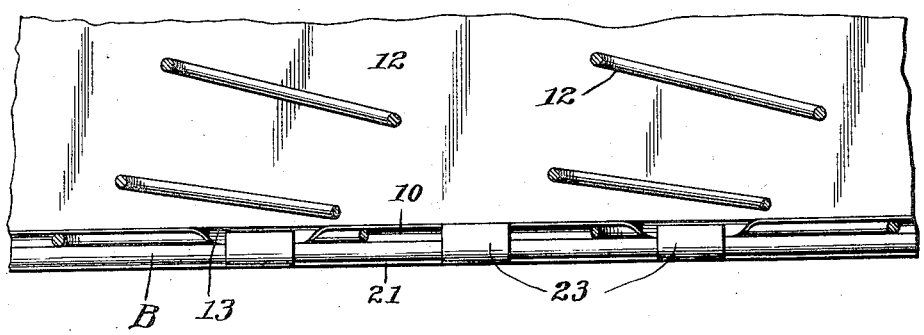
Inventor
Desire H. Van Hove,
By
Attorney Feb. 26, 1924.

D. H. VAN HOVE 1,484,976

SPRING STRUCTURE

Filed Feb. 8, 1922

Inventor
Desire H. Van Hove,

By

Attorney

Patented Feb. 26, 1924.

1,484,976

UNITED STATES PATENT OFFICE.

DESIRE H. VAN HOVE, OF JACKSON, MICHIGAN, ASSIGNOR TO REYNOLDS SPRING COMPANY, OF JACKSON, MICHIGAN.

SPRING STRUCTURE.

Application filed February 8, 1922. Serial No. 535,070.

*To all whom it may concern:*

Be it known that I, DESIRE H. VAN HOVE, a citizen of the United States, residing at Jackson, in the county of Jackson and State of Michigan, have invented new and useful Improvements in Spring Structures, of which the following is a specification.

This invention relates to spring structures.

Spring structures for automobiles and the like are generally made or built in one plant and purchased by automobile or other manufacturers who upholster or who have the spring structures upholstered for use in automobiles or sale to the trade.

It is therefore one object of my invention to provide a spring structure, embodying among other characteristics, a structure wherein the upholstering cover may be easily, quickly and effectively applied and attached to the base frame without danger of accidental disconnection therefrom.

Another object resides in the provision of a base frame having a groove in which the marginal edge of the skirt of the upholstering covering may be secured by a suitable locking means having the dual function of securing the covering to the base frame and reinforcing the latter.

A still further object is to provide a spring structure embodying a base frame to which the border springs and covering skirt may be readily applied and connected to the base frame through the instrumentality of suitable locking means designed to lock both the border springs and the marginal edge of the covering skirt thereto.

In the drawings:

Fig. 1 is a fragmentary sectional view illustrating the covering applied to the spring structure.

Fig. 2 is a detail perspective view of a portion of the base frame.

Fig. 3 is a detail perspective view of a portion of one embodiment of locking means for securing the marginal edge of the skirt of the covering to the base frame.

Fig. 4 is a fragmentary sectional view through a portion of a spring structure, illustrating the inner side of the base frame with the covering and locking device applied.

Figure 5:
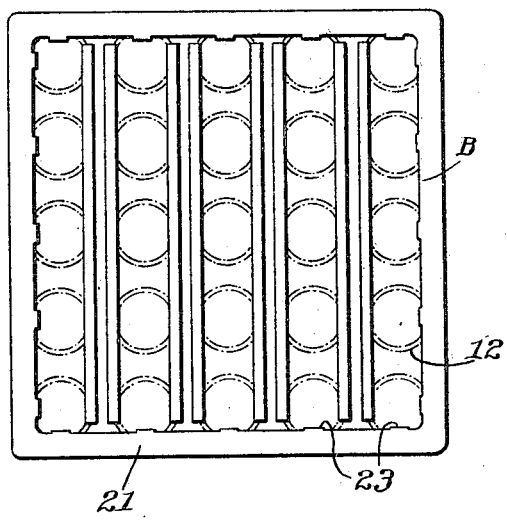
Fig. 5 is an inverted plan view.

Referring now more particularly to the accompanying drawings, the reference letter A indicates, generally, a base frame, illustrated as of S-shape, and composed of sheet metal folded longitudinally upon itself to form inner and outer continuous longitudinal grooves 10 and 11, respectively.

Springs 12, having their base coils connected to pairs of U-bars are located within the base frame, the flanges of the U-bars being compressed or pinched onto the base coils to effect a proper connection between the springs and their supports, as indicated at 12'. The end springs of each row project slightly beyond the ends of the bars and have their base coils fitted in the inner groove 10 of the base frame with the upper wall of the groove 10 compressed or pinched down onto the coil of such spring, as shown at 13, thereby mounting the springs effectually on the base frame. The upper ends of the border springs may be connected to an upper frame 14 by means of suitable clips 15 and stay wires 16 may be clipped or otherwise secured at 17 to the upper ends of the springs.

An upholstery covering is shown at 18 and it includes a skirt 19 which encloses the springs. The marginal edge of the skirt is folded, as indicated at 20. The skirt is drawn taut downwardly and the folded marginal edge disposed in the aforesaid outer groove 11 of the base frame and held firmly therein by means of a suitable locking member, indicated, generally, by the reference letter B.

The locking member B is composed preferably of a narrow strip of sheet metal of a length to extend entirely around the base frame. This strip comprises a body portion 21 having an upwardly and inwardly directed flange 22 which may extend the length of the strip and which is adapted to be inserted into or enter the aforesaid continuous outer groove of the base frame over the fold 20 of the marginal edge of the skirt to lock the skirt against accidental disconnection from the base frame, the body portion 21 of the locking strip being of a width the same or slightly greater than the width of the lower wall of said outer groove and preferably having a relatively tight fit on said wall to cooperate with said flange to cause the latter to bind the fold 20 between it and the inner face of the lower wall of the outer groove to hold the edge of the skirt tightly in said groove. The skirt may be drawn down over the side of the base frame and the edge of the flange placed over the skirt opposite the outer groove and by inward pressure on the skirt the latter may be folded as it is pressed or forced into the groove by the flange. In other words, the marginal edge of the skirt may be folded before the flange 22 is applied or the fold may be formed by the flange 22 as said flange is forced or inserted into the outer groove. The body portion 21 of the locking strip may have spaced fingers 23 extending from the inner edge thereof to be folded over the rear wall of the outer groove to insure against any possible accidental dislodgement of the locking member from its operative position. As the flange 22 of the locking strip takes its operative position in the outer groove 10 of the base frame it tends to pull upon the skirt, incident to the forcing of the same inwardly into the groove, thereby aiding in drawing the skirt taut.

Figure 7:
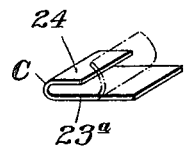
Fig. 7 is a detail perspective view of the modified form of locking device.
Figure 8:
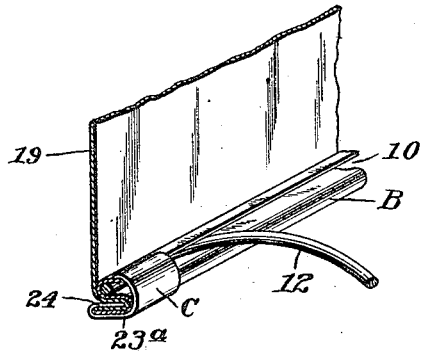
Fig. 8 is a detail sectional view showing the locking device securing both the skirt and the border springs to the base frame.
Figure 6:
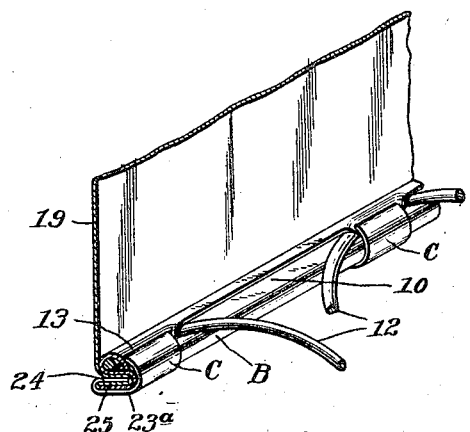
Fig. 6 is a sectional perspective view of a portion of the base frame, showing a modified form of locking device.

As a modified form of locking device, and one provided for cheaper grade structures than the one above described, the locking device may be in the nature of short members C rather than a long continuous strip as first described. To this end I may employ a plurality of locking devices C, spaced apart as shown in Figs. 6 and 7 and each consisting of a body portion 23 having a flange 24 adapted to fit in the outer groove 25 of the base frame and bind the marginal edge of the skirt between the flange 24 and the inner face of the lower wall of the outer groove 25 and hold the skirt tightly in the groove, each of the locking devices B having a finger at the inner edge of its body bendable over the rear wall of the outer groove after the manner suggested in the first form described. Thus in both forms of the invention the locking device holds the skirt in the outer groove. In either form of the invention the finger or fingers along the inner edge of the body portion of the locking device may extend over the inner, inwardly opening groove into engagement with the pinched or compressed portion 13 to aid in holding the border springs in the inner groove of the base frame and in some instances, as shown, the said fingers, without compressing a wall of the inner groove may serve to hold the base coils of the border springs in the inner groove, as shown in Fig. 8.

What I claim is:

1. In a spring structure, a base frame composed of a strip of sheet metal folded upon itself into S-shape to provide an inner and an outer curve, springs mounted on the base frame, the border springs having their base convolutions located in the inner groove, a covering for the structure including a skirt having its marginal edge fitted in the outer groove, and a U-shaped strip having one flange disposed under the lower wall of the outer groove and having its opposite flange disposed in the outer groove over the lower edge of the outer groove and over the material of the skirt to secure the edge of the skirt in said outer groove, the lower flange of said U-shaped strip having spaced, projecting fingers bent over the open side of the inner groove and over the base convolutions of the border springs fitted in said inner groove.

2. In a spring structure, a base frame composed of a strip of sheet metal folded upon itself into S-shape to provide superimposed grooves, the upper groove opening inwardly and the lower groove opening outwardly, springs supported on the base frame, the border springs having their base convolutions located in the inner groove, a covering for the structure including a skirt having its marginal edge fitted in the outer groove, and a U-shaped device having its lower flange disposed under the lower wall of the outer groove and having its opposite flange disposed in the outer groove over the marginal edge of the skirt to bind said edge in said outer groove, the said device having a portion bent across the open side of the upper inner groove onto the upper wall of the inner groove and over the adjacent base convolutions of the border springs.

3. In a spring structure, a base frame which is S-shaped in cross section providing an inner longitudinal groove and an outer longitudinal groove, border springs having their base coils located in said inner groove, a covering for the structure including a skirt having its marginal edge located in said outer groove, and a locking strip having means to lock the skirt in said outer groove and to lock said border springs in said inner groove.

In testimony whereof I have hereunto affixed my signature.

DESIRE H. VAN HOVE.